(12) United States Patent
Vanco et al.

(10) Patent No.: US 11,717,918 B2
(45) Date of Patent: Aug. 8, 2023

(54) SCREW ELEMENT OF A BALL SCREW MECHANISM

(71) Applicant: Schaeffler Technologies AG & Co. KG, Herzogenaurach (DE)

(72) Inventors: Yannick Vanco, Strasbourg (FR); Thierry Leobold, Woerth (FR); Dieter Eckert, Fürth (DE); Stefan Grimm, Forchheim (DE); Daniel Hell, Pfaffenhoffen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 597 days.

(21) Appl. No.: 16/626,161

(22) PCT Filed: May 3, 2018

(86) PCT No.: PCT/DE2018/100421
§ 371 (c)(1),
(2) Date: Dec. 23, 2019

(87) PCT Pub. No.: WO2019/001612
PCT Pub. Date: Jan. 3, 2019

(65) Prior Publication Data
US 2020/0171608 A1  Jun. 4, 2020

(30) Foreign Application Priority Data

Jun. 27, 2017 (DE) ...................... 10 2017 114 171.5

(51) Int. Cl.
*B23K 33/00* (2006.01)
*B23K 20/12* (2006.01)
(Continued)

(52) U.S. Cl.
CPC ............ *B23K 33/006* (2013.01); *B23K 20/12* (2013.01); *B23K 35/3053* (2013.01); *F16H 25/24* (2013.01); *F16H 2025/249* (2013.01)

(58) Field of Classification Search
CPC ....... B23K 33/006; B23K 20/12; F16H 25/24; F16H 2025/249
See application file for complete search history.

(56) References Cited

U.S. PATENT DOCUMENTS 4,333,670 A * 6/1982 Holko .................. B23K 35/004
228/175
5,154,340 A * 10/1992 Peacock .............. B23K 33/006
228/114.5
(Continued)

FOREIGN PATENT DOCUMENTS

CN         1334168 A       2/2002
CN        201496109        6/2010
(Continued)

OTHER PUBLICATIONS

Machine Translation of DE102008014994A1 (Year: 2009).*
Machine Translation of DE102011075889A1 (Year: 2012).*

*Primary Examiner* — Jake Cook

(57) ABSTRACT

A screw element of a ball screw mechanism includes a lead screw which, at an axial end, is joined to a rod element using a friction welding process. In order to improve the friction-welded joint, prior to the friction welding process, the lead screw has a circumferential groove on the end face facing the rod element.

10 Claims, 3 Drawing Sheets

(51) Int. Cl.
 *B23K 35/30* (2006.01)
 *F16H 25/24* (2006.01)

(56) References Cited

U.S. PATENT DOCUMENTS

| | | | |
|---|---|---|---|
| 7,743,757 B2* | 6/2010 | Gates | F02D 41/0065 |
| | | | 60/601 |
| 2003/0006542 A1* | 1/2003 | Meintschel | F16F 1/16 |
| | | | 267/154 |
| 2004/0222206 A1 | 11/2004 | Nagase et al. | |
| 2006/0169752 A1* | 8/2006 | Den Boer | B23K 13/06 |
| | | | 228/220 |
| 2008/0127762 A1* | 6/2008 | Baxter | B62D 3/126 |
| | | | 74/422 |
| 2009/0019851 A1 | 1/2009 | Gates et al. | |
| 2009/0220820 A1* | 9/2009 | Kolbe | B23K 33/008 |
| | | | 428/615 |
| 2013/0180728 A1* | 7/2013 | Hugghins | B23K 20/129 |
| | | | 166/242.6 |

FOREIGN PATENT DOCUMENTS

| | | |
|---|---|---|
| CN | 101844271 | 9/2010 |
| CN | 102211249 | 10/2011 |
| CN | 102873461 | 1/2013 |
| CN | 104999174 | 10/2015 |
| DE | 102008014994 A1 | 9/2009 |
| DE | 102011075889 A1 | 11/2012 |
| JP | 2004138209 | 5/2004 |
| KR | 1020080064860 A | 7/2008 |

* cited by examiner

SCREW ELEMENT OF A BALL SCREW MECHANISM

CROSS-REFERENCE TO RELATED APPLICATIONS

This application is the U.S. National Phase of PCT Appln. No. PCT/DE2018/100421 filed May 3, 2018, which claims priority to DE 10 2017 114 171.5 filed Jun. 27, 2017, the entire disclosures of which are incorporated by reference herein.

TECHNICAL FIELD

The disclosure relates to a screw element of a ball screw mechanism, comprising a lead screw, which is joined at an axial end to a rod element, wherein the lead screw and the rod element are integrally bonded to each other by a friction welding process.

BACKGROUND

A screw system is known from DE 10 2008 014 994 A1. It is provided here that a lead screw is connected to a screw head by a ball groove wound in a spiral about the screw axis for the rolling of balls, the screw head being joined by means of a friction welded connection to the lead screw.

One possible application of such a ball screw mechanism is its use in exhaust gas recirculation systems which are used in motor vehicles. In such systems, a valve needs to be activated to control the gas flow, for which the screw system of the ball screw mechanism is used. Here, said screw system is in contact with the exhaust gases, which are very aggressive chemically and have a corrosive action. It is there-fore desirable to make the rod element exposed to the exhaust gases from stainless steel, for which a low carbon fraction is provided in the material. However, it is usually necessary for the lead screw to consist of steel with a high carbon fraction. Therefore, the producing of a friction welded connection between rod element and lead screw is not without problems.

SUMMARY

The problem which the present disclosure endeavors to solve is to improve a screw element of a ball screw mechanism of this kind so that the friction welded connection between the lead screw and the rod element is improved.

The proposed solution is characterized in that the lead screw prior to performing the friction welding process has an annular groove running around the circumferential direction at its end face facing the rod element.

The annular groove may have a V-shape in the radial cross section, wherein the radial thickness of the annular groove increases toward the end face.

The rod element may have a diameter at its end facing toward the lead screw which is less than or equal to the inner diameter of the annular groove at the end face.

The space of the annular groove existing prior to the friction welding process may be at least partly filled with the material of the lead screw and/or with the material of the rod element after performing the friction welding process.

The rod element may be made of stainless steel. The steel of the rod element may have a low carbon content, preferably a carbon content of less than 1.2%.

However, the lead screw may be made of hardened steel. Especially preferably, it is provided that the lead screw may be made of 16MnCr5.

The screw element may be part of an exhaust gas recirculation system of a motor vehicle. In this regard in particular, it is provided that the rod element is connected to a valve of the exhaust gas recirculation system and activates it.

The proposed solution enables a reliable and stable connection between a lead screw and a rod element, wherein, as mentioned, the rod element consists of stainless steel and the lead screw preferably consists of case hardened steel.

The lead screw consists of a steel with a high carbon fraction, wherein preferably an enrichment of the carbon fraction is accomplished during the heat treatment (case hardening), the surface of the lead screw having a hardness of preferably over 650 HV.

The proposed design of the lead screw in cooperation with the rod element means that a deep-seated diffusion can be achieved during the friction welding process, so that a stable connection of the two friction-welded partners and thus a ductile connection of the materials can be achieved across the surface region.

A further benefit of the proposed solution is the very compact structure of the screw element, making it possible to preserve a small design space for the element.

Furthermore, it is advantageous that a very stable mechanical connection is found between the two friction-welded partners, so that relatively large tensile forces can be transmitted.

Hence, a stable and ductile connection between the two friction-welded partners can be achieved, even though the starting materials of the two partners are very different and are initially hardly suitable for a welded connection.

DETAILED DESCRIPTION

Figure 1:
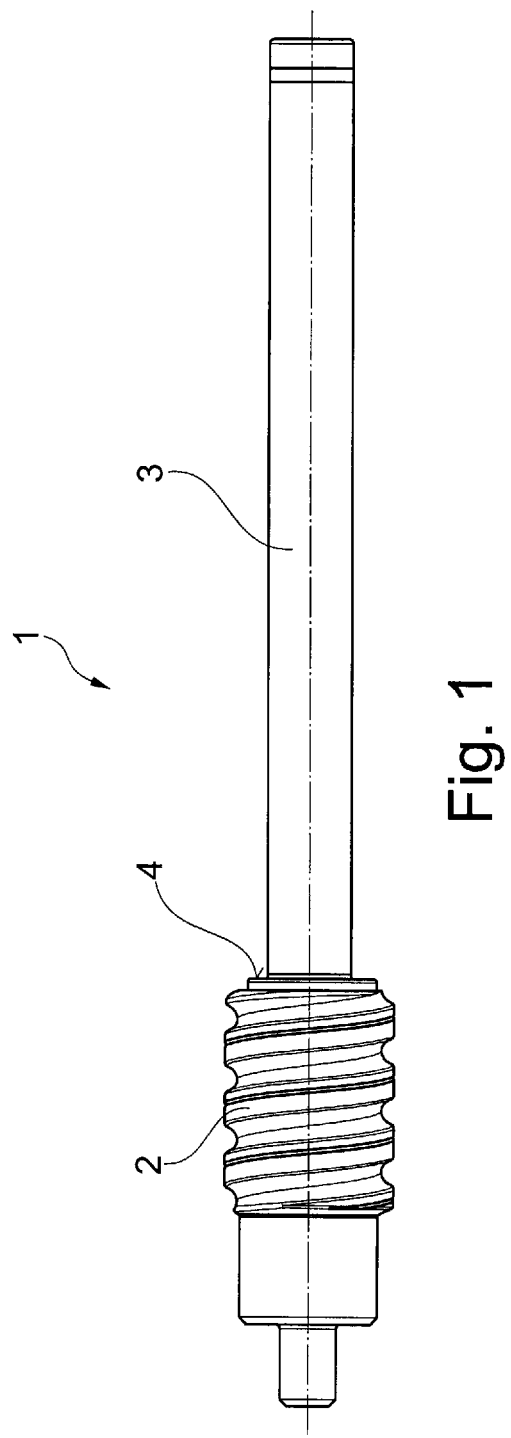
FIG. 1 a side view of a screw element, comprising a lead screw and a rod element, which is joined to the lead screw by friction welding, FIG. 2 a side view of the lead screw, shown in partial cross section, and an end segment of the rod element prior to making the friction welded connection, and FIG. 3 a side view of the screw element, shown in partial cross section, after making the friction welded connection.

FIG. 1 shows a screw element 1 of a ball screw mechanism, comprising a lead screw 2, which is joined to a rod element 3 by means of friction welding. The rod element 3 is secured by said friction welding process to an end face 4 of the lead screw 2.

Figure 3:
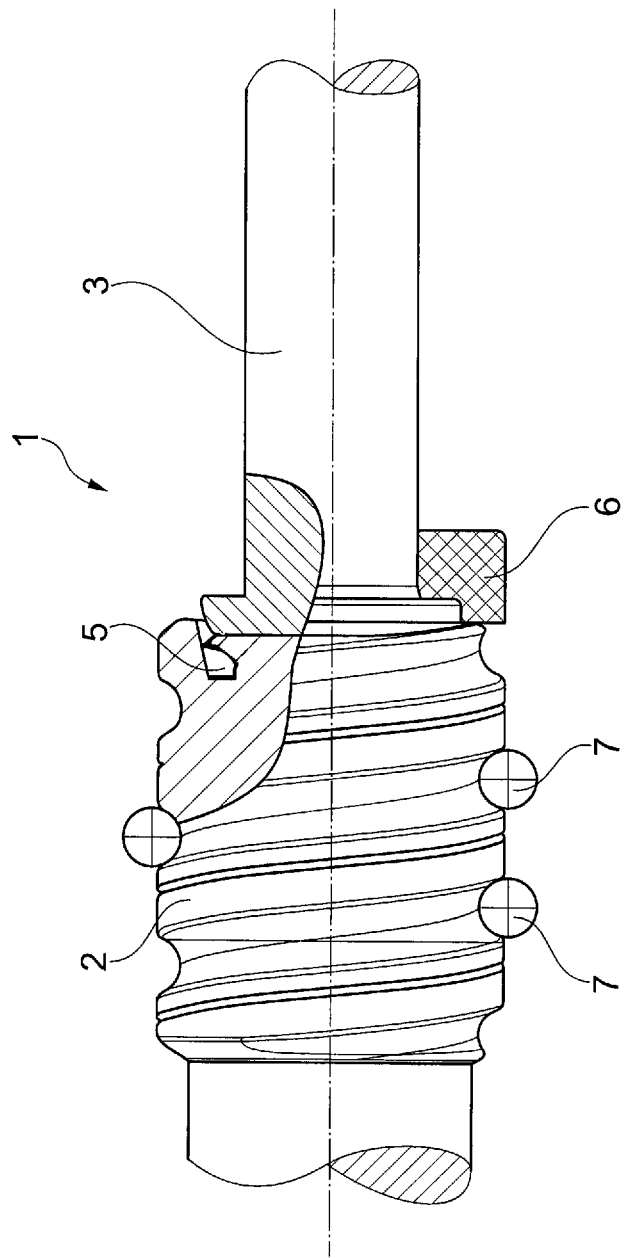

The lead screw 2 comprises on its outer circumference at least one ball groove, in which balls 7 run, as schematically indicated in FIG. 3.

Figure 2:
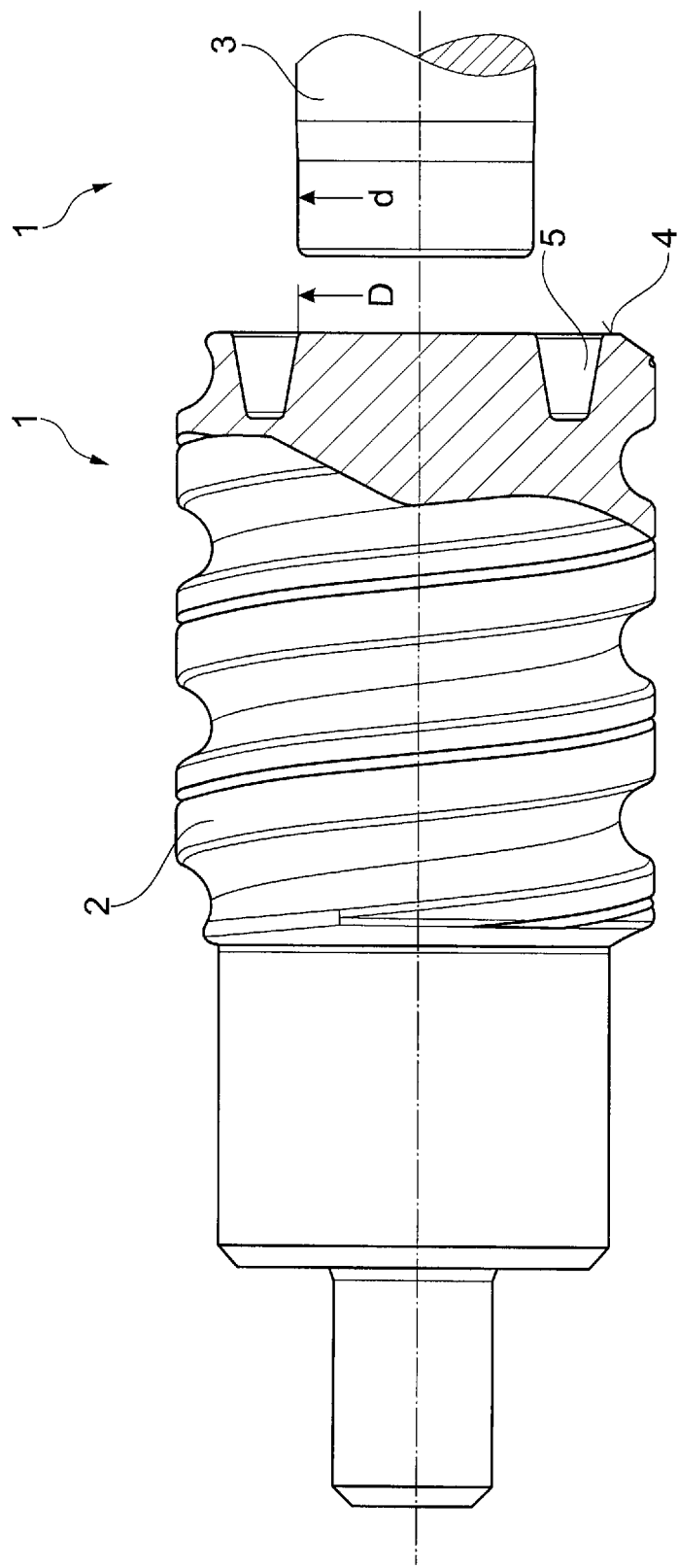

In order for the friction welded connection between the lead screw 2 and the rod element 3 to be stable in the above explained sense, the lead screw 2 has a configuration as represented in FIG. 2 before performing the friction welding process.

Accordingly, an annular groove 5 is machined into the end face 4 of the lead screw 2, said annular groove running in the circumferential direction and having a V-shape in the radial cross section according to one possible embodiment of the proposed solution, as can be seen in FIG. 2. The diameter of the rod element d corresponds substantially to the inner diameter D of the annular groove 5 at the end face 4, as shown in FIG. 2.

The annular groove 5 is preferably worked by a turning process into the lead screw 2.

When performing the friction welding process, the lead screw 2 and the rod element 3 are pressed against each other in the axial direction, while at the same time a relative rotary movement is created between the two components. The friction welding process, which is known in itself, results in the connection shown in FIG. 3.

Accordingly, it can be seen that material of both the lead screw 2 and the rod element 3 which has been melted by the friction welding process goes into the originally existing space of the annular groove 5.

A certain axial region is available for the friction welding process, as indicated by reference number 6 in FIG. 3.

The axial end of the rod element 3 may have a slightly conical region, besides a cylindrical segment, as indicated in FIG. 2.

With the proposed solution, a stable connection can be produced between the rod element 3 and the lead screw 2, resulting from a ductile connection of the materials of the two components. Accordingly, an advantageously durably stable connection is assured between the two components.

The shape of the annular groove 5—a V in the exemplary embodiment—may naturally also have other configurations, which can be used advantageously.

In regard to the dimensioning of the annular groove 5, it should be pointed out that the size relations in FIG. 2 are not drawn true to scale and an advantageous configuration of the dimensions of the geometrical magnitudes is assumed here.

LIST OF REFERENCE NUMBERS

1 Screw element
2 Lead screw
3 Rod element
4 End face of lead screw
5 Annular groove
6 Possible region available for the friction welding
7 Ball
d Diameter of the rod element
D Inner diameter of the annular groove

The invention claimed is:

1. A screw element of a ball screw mechanism, comprising a lead screw, which is joined at an axial end to a rod element, wherein:
   a first end face of the lead screw and a second end face of the rod element are integrally bonded to each other by a friction welding process, and
   the lead screw prior to performing the friction welding process has an annular groove extending circumferentially on the first end face, a radial outer-most extent of the annular groove arranged radially inwardly of an outer surface of the first end face of the lead screw, and
   the rod element has an outer-most diameter at its second end face facing toward the lead screw which is less than or equal to an inner diameter of the annular groove, the inner diameter defined by a radial inner-most extent of the annular groove.

2. The screw element as claimed in claim 1, wherein the annular groove has a V-shape in a radial cross section, and wherein a radial thickness of the annular groove increases toward the end face.

3. The screw element as claimed in claim 1, wherein a space of the annular groove existing prior to the friction welding process is at least partly filled with material of the lead screw or with material of the rod element after performing the friction welding process.

4. The screw element as claimed in claim 1, wherein the rod element consists essentially of stainless steel.

5. The screw element as claimed in claim 4, wherein the steel of the rod element has a carbon content of less than 1.2%.

6. The screw element as claimed in claim 1, wherein the lead screw consists essentially of hardened steel.

7. The screw element as claimed in claim 6, wherein the lead screw consists essentially of 16MnCr5.

8. The screw element as claimed in claim 1, wherein it is part of an exhaust gas recirculation system of a motor vehicle.

9. The screw element as claimed in claim 8, wherein the rod element is connected to a valve of the exhaust gas recirculation system and activates it.

10. The screw element as claimed in claim 1, wherein an opening of the annular groove faces the rod element.

* * * * *